United States Patent [19]

Okumura et al.

[11] Patent Number: 5,693,236
[45] Date of Patent: Dec. 2, 1997

[54] WATER-REPELLENT SURFACE STRUCTURE AND ITS FABRICATION METHOD

[75] Inventors: Tomohiro Okumura, Neyagawa; Ichiro Nakayama, Kadoma; Chikako Goto, Kawakami-gun; Tadashi Imai, Osaka, all of Japan

[73] Assignee: Matsushita Electric Industrial Co., Ltd., Osaka-fu, Japan

[21] Appl. No.: 447,936

[22] Filed: May 23, 1995

[30] Foreign Application Priority Data

May 23, 1994 [JP] Japan .................. 6-108417

[51] Int. Cl.$^6$ .................. C09K 3/00
[52] U.S. Cl. .................. 216/7; 216/11; 428/87; 428/378; 428/328; 427/340
[58] Field of Search .................. 216/7, 11

[56] References Cited

U.S. PATENT DOCUMENTS

| | | | |
|---|---|---|---|
| 5,091,765 | 2/1992 | Yoshinaka et al. | 338/15 |
| 5,164,260 | 11/1992 | Yoshinaka et al. | 428/328 |
| 5,183,594 | 2/1993 | Yoshinaka et al. | 252/518 |
| 5,279,809 | 1/1994 | Kitano et al. | 423/622 |
| 5,378,521 | 1/1995 | Ogawa et al. | 428/85 |
| 5,437,894 | 8/1995 | Ogawa et al. | 427/535 |

FOREIGN PATENT DOCUMENTS

| | | |
|---|---|---|
| 2-192498 | 7/1990 | Japan . |
| 4-124047 | 4/1992 | Japan . |

Primary Examiner—R. Bruce Breneman
Assistant Examiner—Michael E. Adjodha
Attorney, Agent, or Firm—Wenderoth, Lind & Ponack

[57] ABSTRACT

A method for fabricating a water-repellent surface, including steps of preparing a mixture by mixing a curable liquid with a needle-like material, applying the mixture onto a surface of an object, curing a liquid of the applied mixture and forming an applied layer in which the needle-like material has been mixed on a base material of the cured liquid of the mixture, forming pits and projections of the needle-like material on a surface of the applied layer by etching the applied layer under a condition where an etching rate of the base material is larger than that of the needle-like material, and coating the surface of the applied layer with a water-repellent substance.

5 Claims, 6 Drawing Sheets

WATER-REPELLENT SURFACE STRUCTURE AND ITS FABRICATION METHOD

BACKGROUND OF THE INVENTION

The present invention relates to a water-repellent surface structure having an extremely good water repellency, and to a method for fabricating the same.

The applicable field of this water-repellent surface structure is described in detail. For example, if the surface of a ship bottom is provided with water repellency, a thin air film is formed between the ship bottom surface and the sea water, so that the resistance due to water viscosity is reduced substantially. This makes it possible to increase the navigation velocity.

Also, if the surface of a toilet bowl is provided with water repellency, urine falls down without depositing on the bowl, so that the bowl will have less deposits of dirts or odors. This allows cleaning frequency to be reduced to a great extent. Similar advantages can be offered also with water-related equipment such as washstands and sinks, bathtubs, and tiles, or with their surrounding floors, ceilings and walls.

Further, the water-repellent surface is applicable to bodies of vehicles such as automobiles, motorcycles, bicycles, and airplanes, or to outer walls of buildings, furniture, tableware, shoes, umbrellas, and the like, in terms of prevention of dirt and wet.

Metal surfaces that are required to be resistant to corrosion, such as piping interiors or steel frame surfaces, are in general rust-inhibited with coatings. However, since coatings are limited in working life, the metal surfaces will corrode gradually but growingly due to water drips deposited on the surfaces. Such surfaces, if provided with water repellency, are freed from deposition of water drips, so that their corrosion resistance is dramatically improved.

If frost occurs on fins of a heat exchanger, there will be a decrease in the quantity of air that passes between the fins, resulting in deteriorated heat exchanging ability. Whereas condensed water that has occurred on the fins exists in the form of a water film on hydrophilic surfaces, it exists in a dome shape on water-repellent surfaces. In the latter case, the contact area of the condensed water with the fins is relatively small, so that longer time is needed for the condensed water to freeze.

In other words, the continuous operating time of a heat exchanger can be prolonged by providing the surfaces of the fins of the heat exchanger with water repellency.

Fasteners of water-proof clothes have slight clearances for structural reasons and, as a result, submersion may occur through the clearances. If the fasteners are provided with water repellency, the submersion can be reduced remarkably.

Portable wooden canoes increase in weight due to moisture penetration, so that the load of carry increases. If such a wooden canoe is provided with water repellency, it is freed from water penetration and therefore can be prevented from increasing in weight.

Bridges on the sea, whose girders are in contact with the sea water, are short in life due to corrosion of their steel frames and concretes. If such bridge girders are provided with water repellency, they can also be prolonged in service life.

In addition to the above applications, the water-repellent surface structure has a wide variety of applications, limitlessly.

Conventionally, there have been proposed various types of water-repellent surface structures in which a surface of an object with pits and projections physically formed thereon is coated with a chemically water-repellent substance.

For example, a surface fabricated by coating a metal mirror surface with a water-repellent substance has a water-contact angle of approximately 110 degrees. However,it is known that if the surface is provided with small pits and projections, its water contact angle can be enhanced up to 120 degrees or more even with coating of the same water-repellent substance.

As the conventional method of forming the above pits and projections on object surfaces, it has been common practice to use the mechanical coarse surface processing with sand blasting or, particularly for glass surfaces and the like, the etching process with the use of chemicals. Also, as the method of forming pits and projections on a glass surface, Japanese Laid-Open Patent Publication No. 4-124047 discloses a method in which a metal oxide film is formed on the glass surface and the surface is dry-etched by making use of Ar plasma.

However, these methods have their inherent drawbacks. The mechanical coarse surface processing and the chemical etching have limitations in furthering the smallness of the pits and projections, such that a surface having a good water repellency with an about 150 degree water-contact angle, for example, is difficult to fabricate as a problem. Also, the method of processing by making use of Ar plasma has a problem that the processing takes a great deal of time.

SUMMARY OF THE INVENTION

An object of the present invention is therefore to provide a water-repellent surface structure that exhibits excellent water repellency by extremely small pits and projections being efficiently formed on a surface of an object, and to provide a method of fabricating the same.

In accomplishing these and other objects, according to a first aspect of the present invention, there is provided a method for fabricating a water-repellent surface, comprising steps of:

preparing a mixture by mixing a curable liquid with a needle-like material;

applying the mixture onto a surface of an object;

curing a liquid of the applied mixture and forming an applied layer in which the needle-like material has been mixed on a base material of the cured liquid of the mixture;

forming pits and projections of the needle-like material on a surface of the applied layer by etching the applied layer under a condition where an etching rate of the base material is larger than that of the needle-like material; and coating the surface of the applied layer with a water-repellent substance.

According to a second aspect of the present invention, there is provided a method for fabricating a water-repellent surface, comprising steps of:

preparing a mixture by mixing a curable liquid with a needle-like material;

molding the mixture into an arbitrary shape and thereafter curing a liquid of the mixture to yield an object in which the needle-like material has been mixed into a base material of the cured liquid of the mixture;

forming pits and projections of the needle-like material on a surface of the object by etching the surface of the object under a condition where an etching rate of the base material is larger than that of the needle-like material; and coating the surface of the object with a water-repellent substance.

According to a third aspect of the present invention, there is provided a method for fabricating a water-repellent surface, comprising steps of:

preparing a mixture by mixing a sinterable powder with a needle-like material;

molding the mixture into an arbitrary shape and thereafter sintering power of the mixture to yield an object in which the needle-like material has been mixed into a base material of the sintered powder;

forming pits and projections of the needle-like material on a surface of the object by etching the surface of the object under a condition where an etching rate of the base material is larger than that of the needle-like material; and coating the surface of the object with a water-repellent substance.

According to a fourth aspect of the present invention, there is provided a method for fabricating a water-repellent surface, comprising steps of:

applying an adhesive substance onto a surface of an object;

dispersing a needle-like material on the surface of the object and immobilizing the needle-like material by an adhesive substance; and coating the surface of the immobilized needle-like material with a water-repellent substance.

According to a fifth aspect of the present invention, there is provided a method for fabricating a water-repellent surface, comprising steps of:

dispersing a needle-like material on a surface of an object;

applying an adhesive substance onto the surface of the object with the needle-like material dispersed thereon to immobilize the needle-like material; and coating the surface of the immobilized needle-like material with a water-repellent substance.

According to a sixth aspect of the present invention, there is provided a method for fabricating a water-repellent surface, comprising steps of:

dispersing a needle-like material on a surface of an object;

depositing a thin film on the surface of the object with the needle-like material dispersed thereon to thereby immobilize the needle-like material; and coating the surface of the immobilized needle-like material with a water-repellent substance.

According to a seventh aspect of the present invention, there is provided a method for fabricating a water-repellent surface, comprising steps of:

coating a surface of a needle-like material with a water-repellent substance;

applying an adhesive substance onto a surface of an object; and dispersing the needle-like material coated with the water-repellent substance, onto the surface of the object with the adhesive substance applied thereto to thereby immobilize the needle-like material on the surface of the object.

According to an eighth aspect of the present invention, there is provided a water-repellent surface structure comprising:

a needle-like fibers having a thickness of 3μ or less to form pits and projections on a surface of an object; and a water-repellent substance from which a surface of the pits and projections is formed.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
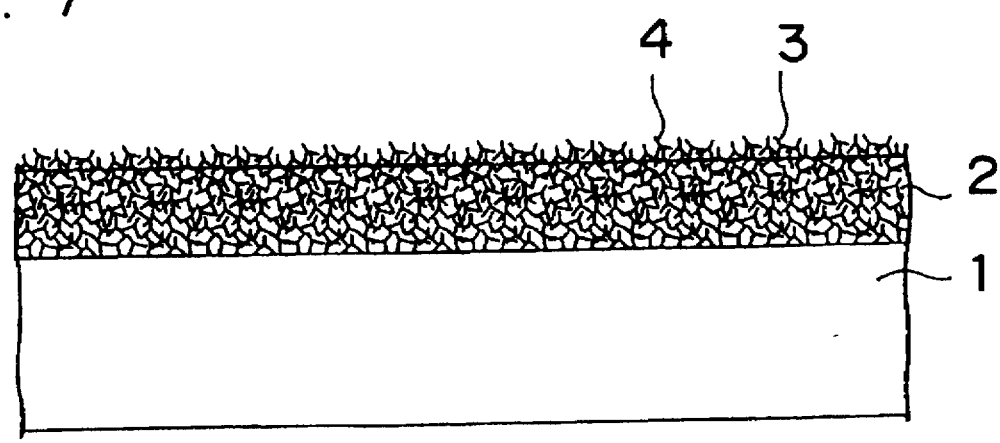
FIG. 1 is a schematic view of a water-repellent surface structure which is a first example of the present invention.

Before the description of the present invention proceeds, it is to be noted that like parts are designated by like reference numerals throughout the accompanying drawings.

(EXAMPLE 1)

The water-repellent surface structure according to a first example of the present invention and a method for fabricating the same are described with reference to FIGS. 1 and 2.

Referring to FIG. 1, zinc oxide whiskers 3 are immobilized on a surface of an object 1 by a resin 2. The surface has a coating layer 4 of a water-repellent substance formed thereon. Such zinc oxide whiskers are disclosed in U.S. Pat. Nos. 5,091,765, 5,164,260, 5,183,594, and 5,279,809.

Figure 2A:
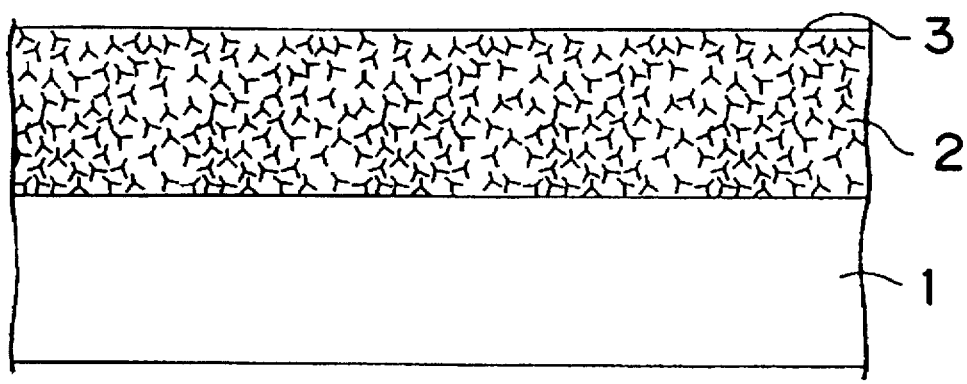
FIGS. 2A, 2B, and 2C are schematic views of the process for fabricating the water-repellent surface of the same example.
Figure 2B:
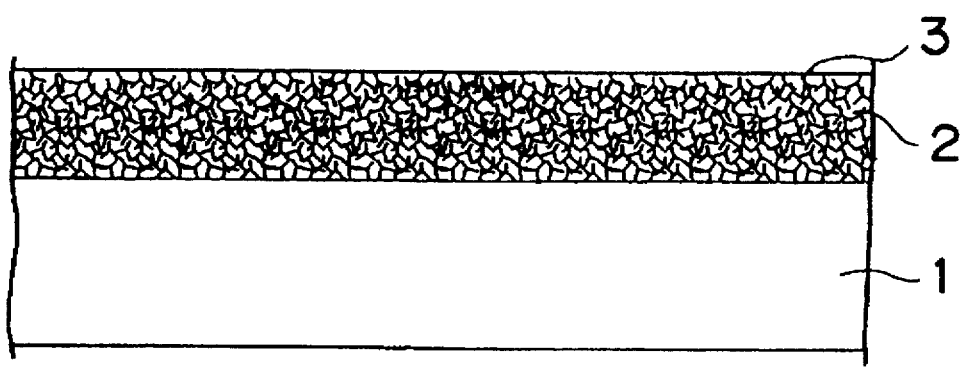
Figure 2C:
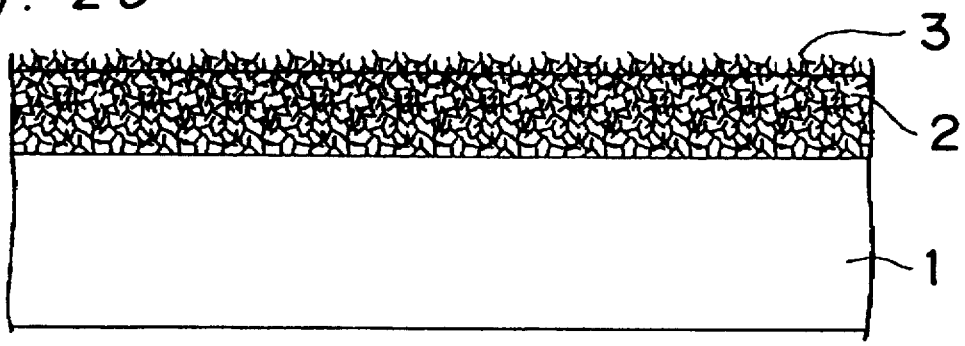

FIGS. 2A to 2C show the process for fabricating the water-repellent surface structure of the present example. First, a liquid mixture obtained by mixing the resin 2, for example resist, which has been dissolved in a solvent and thereby liquefied, with the zinc oxide whiskers 3 with the weight ratio of 1:2 is applied to the surface of the object 1 while the object 1 is rotated (FIG. 2A).

Next, the resin 2 is cured by heating (FIG. 2B). Over this step, the resin 2 is slightly reduced in thickness. Subsequently, the surface is etched under conditions including a large ratio of the etching rate of the resin 2 to that of the zinc oxide whiskers 3, so that needle-like fibers of the zinc oxide whiskers 3 appear on the surface (FIG. 2C). For example, it is preferable that the "large ratio" means that the etching rate of the base material is, e.g. five times, larger than that of the needle-like material. The etching for this process may be the wet etching with a remover, or the dry etching with $O_2$ plasma, for example when the resin 2 is resist. Finally, the surface is coated with a water-repellent substance (not shown). The coating may be selected from among various coating methods, such as the deposition of fluoric polymers implemented by forming a gas containing C and F, e.g. $CHF_3$ gas, into plasma, the baking of fluorocarbon polymers, the coating of a chemical adsorption monomolecular film containing fluorine formed through siloxane bond, the application of fluororesins, the application of silicon resins, and the like.

Figure 9:
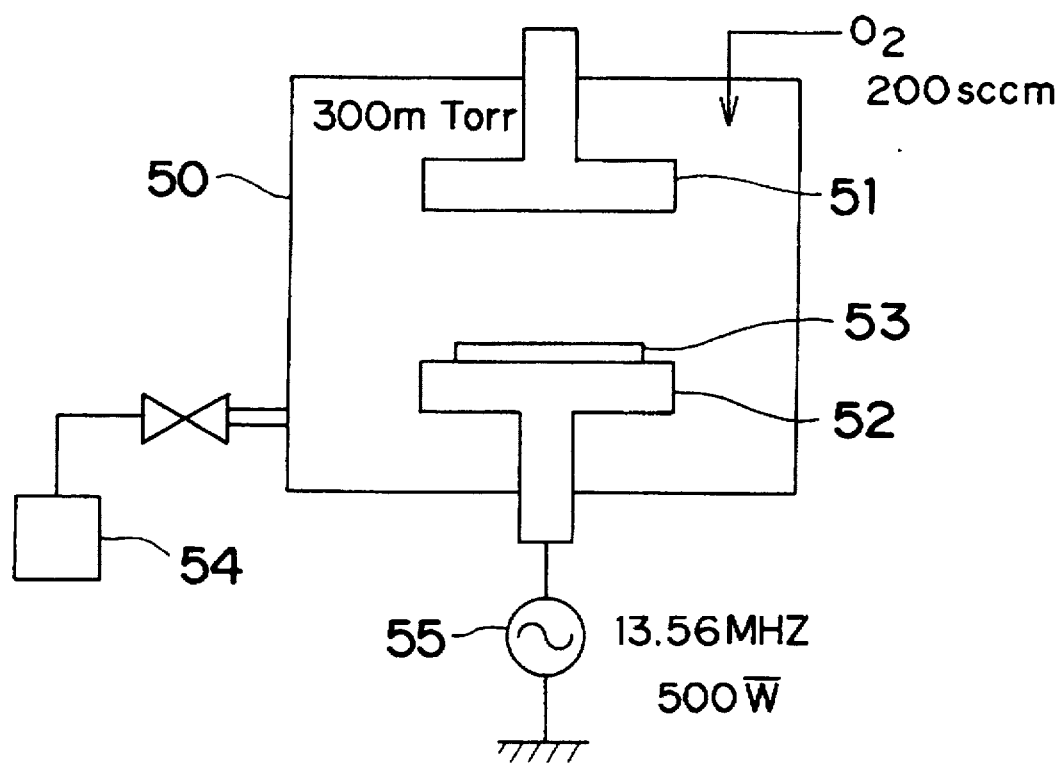
FIG. 9 is a schematic view of a dry etching device.

The dry etching process can be carried out by a dry etching device shown in FIG. 9. The device includes a vacuum chamber 50 into which a $O_2$ gas is inserted at 200 sccm and which vacuum degree is approximately 300 mTorr, an upper electrode 51, a lower electrode 52 on which an object 53 to be processed is placed, a vacuum pump 54 for discharging an inside gas from the chamber 50, and a high frequency voltage source 55 at 13.56 MHz and 500 W. The object 53 is processed in the device during, for example, ten minutes.

The water-repellent surface of the object 1 obtained in this way was measured for its water contact angle. As a result, a value as great as about 150 degrees was obtained.

(EXAMPLE 2)

The water-repellent surface structure according to a second example of the present invention and a method for fabricating the same are described with reference to FIGS. 3 and 4.

Figure 3:
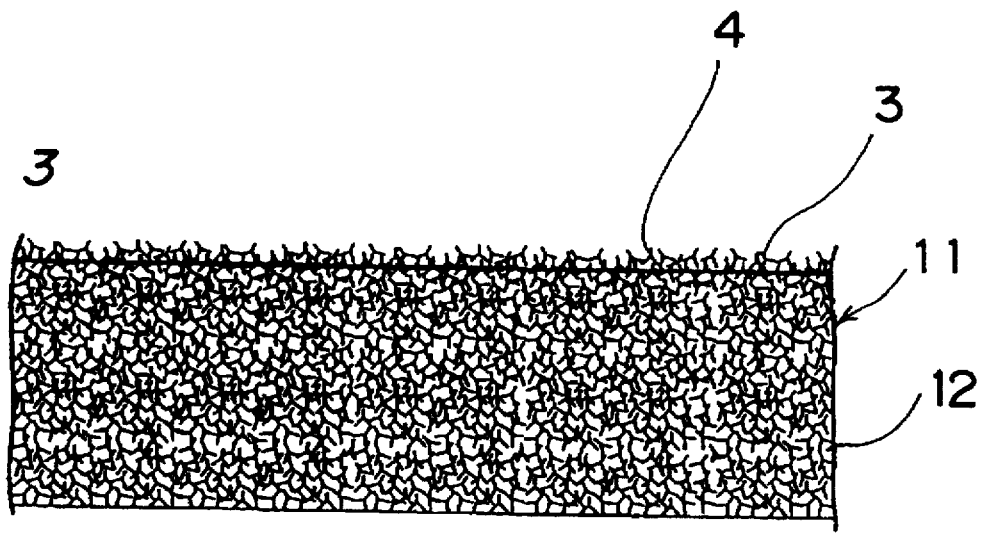
FIG. 3 is a schematic view of a water-repellent surface structure which is a second example of the present invention.

Referring to FIG. 3, zinc oxide whiskers 3 are immobilized on a surface of an object 11. The surface has a coating layer 4 of a water-repellent substance formed thereon.

Figure 4A:
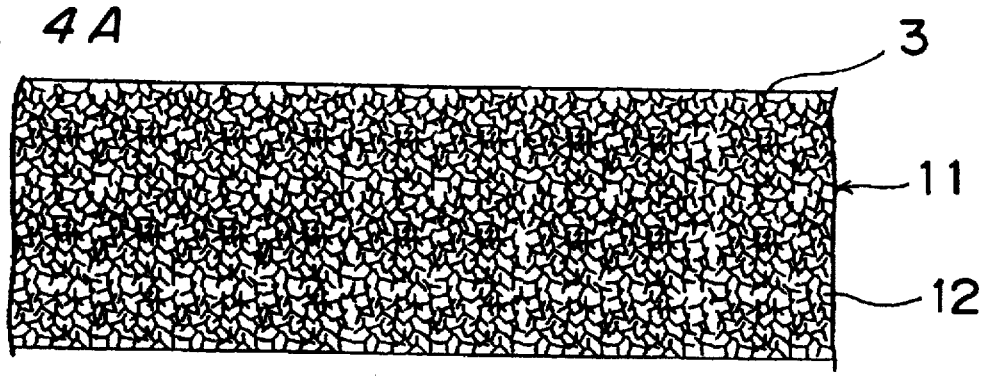
FIGS. 4A and 4B are schematic views of the process for fabricating the water-repellent surface of the same example.
Figure 4B:
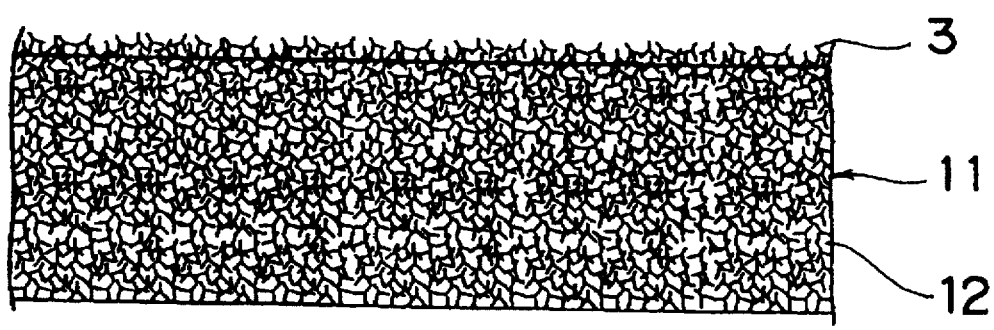

FIGS. 4A and 4B show the process for fabricating the water-repellent surface structure of the present example. First, a mixture of a resin 12 for injection molding, which has been heated and thereby liquefied, with the zinc oxide whiskers 3 is molded into an arbitrary shape by injection molding and then cured (FIG. 4A). Next, the surface is etched under conditions including a large ratio of the etching rate of the resin 12 to that of the zinc oxide whiskers 3, so that the zinc oxide whiskers 3 appear on the surface of the object 11 (FIG. 4B). For example, it is preferable that the "large ratio" means that the etching rate of the base material is, e.g. five times, larger than that of the needle-like material. The etching for this process may be either the wet etching or the dry etching. Finally, the surface is coated with a water-repellent substance (not shown). The coating may be any one of various methods as in the first example.

The water-repellent surface of the object 11 obtained in this way was measured for its water contact angle. As a result, a value as great as about 150 degrees was obtained.

(EXAMPLE 3)

The water-repellent surface structure according to a third example of the present invention and a method for fabricating the same are described with reference to FIGS. 5 and 6.

Figure 5:
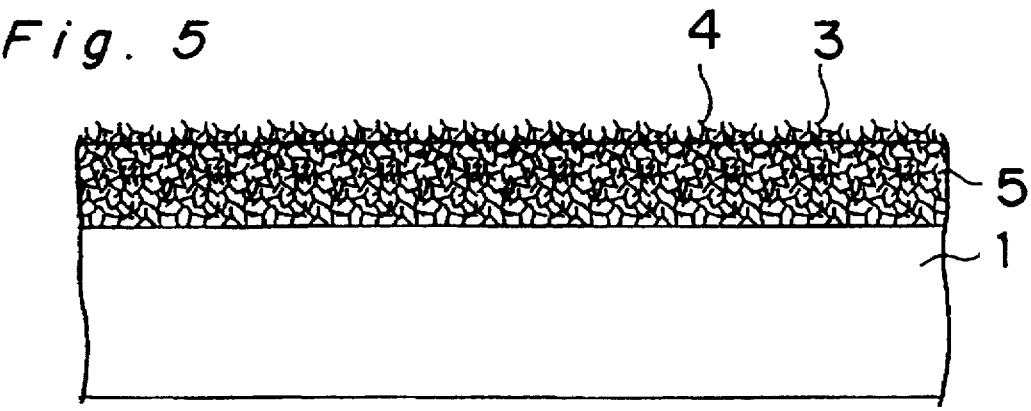
FIG. 5 is a schematic view of a water-repellent surface structure which is a third example of the present invention.

Referring to FIG. 5, zinc oxide whiskers 3 are immobilized on a surface of an object 1 by an adhesive substance 5, a pressure sensitive adhesive double coated tape, an adhesive, or the like. The surface has a coating layer 4 of a water-repellent substance formed thereon.

Figure 6A:
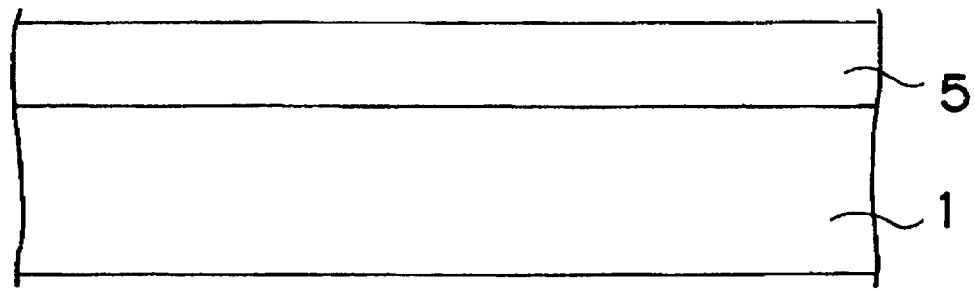
FIGS. 6A and 6B are schematic views of the process for fabricating the water-repellent surface of the same example.
Figure 6B:
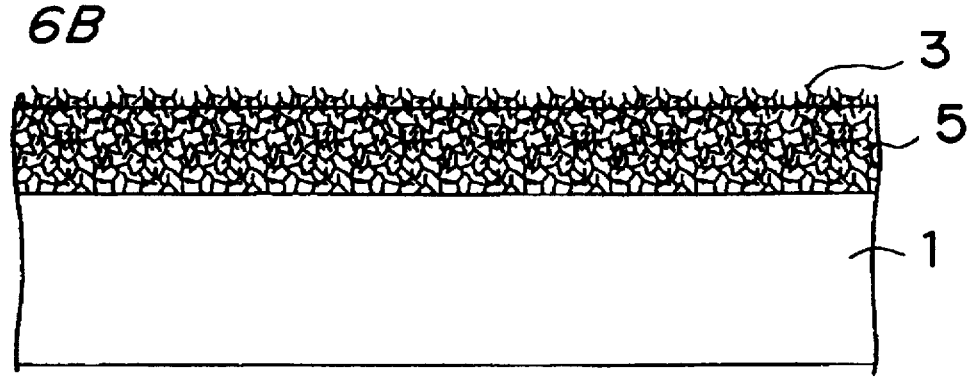

FIGS. 6A and 6B show the process for fabricating the water-repellent surface structure of the present example. First, the adhesive substance 5 is applied onto the surface of the object 1 (FIG. 6A). Then, the zinc oxide whiskers 3 are sprayed and dispersed thereon (FIG. 6B). Finally, the surface is coated with a water-repellent substance (not shown). The coating method may be any one of various types as in the first example.

The water-repellent surface of the object 1 obtained in this way was measured for its water contact angle. As a result, a value as great as about 150 degrees was obtained.

(EXAMPLE 4)

The water-repellent surface structure according to a fourth example of the present invention and a method for fabricating the same are described with reference to FIG. 7.

The water-repellent surface structure is the same as in the third example. Its description is omitted here and the description made by referring to FIG. 5 is incorporated into this example.

Figure 7A:
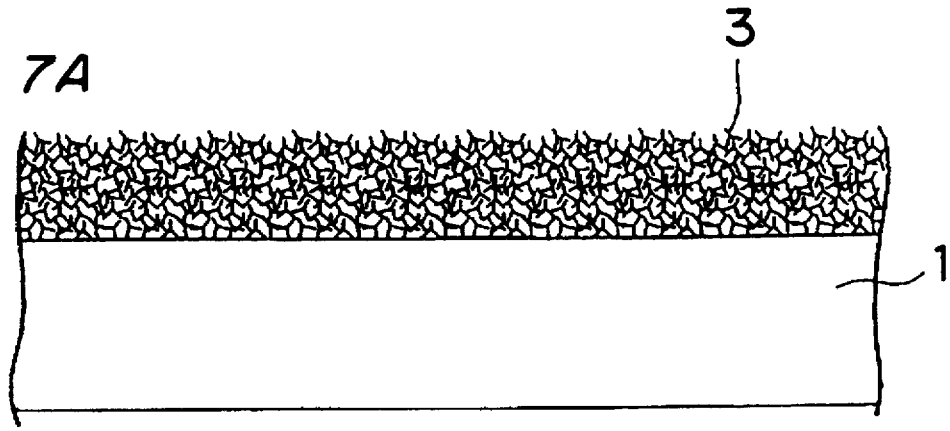
FIGS. 7A and 7B are schematic views of the process for fabricating a water-repellent surface which is a fourth example of the present invention.
Figure 7B:
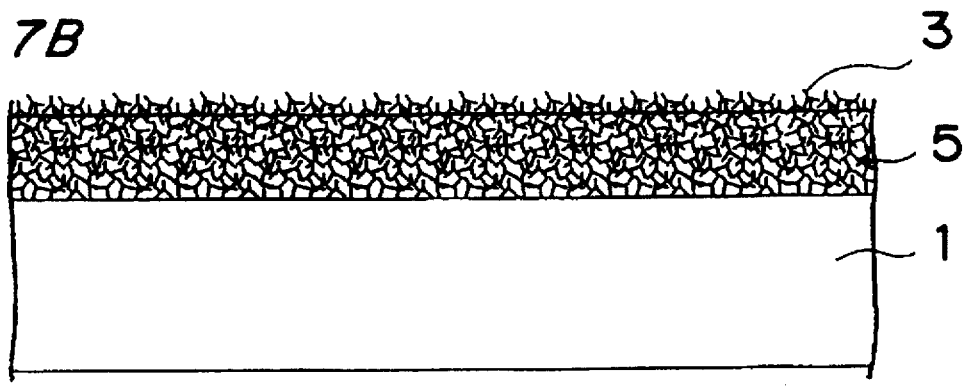

FIGS. 7A and 7B show the process for fabricating the water-repellent surface structure of the present example. First, zinc oxide whiskers 3 are dispersed on the surface of an object 1 (FIG. 7A). One method of the dispersion is spraying, and another is, for example, one in which part of the process in the first example is modified as follows. That is, first, a mixture obtained by mixing a resin, which has been dissolved in a solvent and liquefied, for example resist, with the zinc oxide whiskers 3 is applied onto the surface of the object 1. Next, the resin is cured by heating, and then etched under conditions including a large ratio of the etching rate of the resin to that of the zinc oxide whiskers, so that the resin is entirely etched. For example, it is preferable that the "large ratio" means that the etching rate of the base material is, e.g. five times, larger than that of the needle-like material. Over these processes, such a surface as shown in FIG. 7A can be obtained. Subsequently, an adhesive substance 5 is applied onto the surface so that the zinc oxide whiskers 3 are immobilized (FIG. 7B). The spraying process or the like may be used for the application of the adhesive substance 5.

Finally, the surface is coated with a water-repellent substance (not shown). For this coating, various coating methods are applicable as in the first example. If the adhesive substance 5 is composed of fluororesin, the coating may be omitted.

The water-repellent surface of the object 1 obtained in this way was measured for its water contact angle. As a result, a value as great as about 150 degrees was obtained.

According to the above-described examples, micro pits and projections attributable to the micro needle-like material are formed on the surface of the object and moreover the surface is coated with a water-repellent substance. Thus, a water-repellent surface having remarkably excellent water repellency can be obtained.

Figure 8:
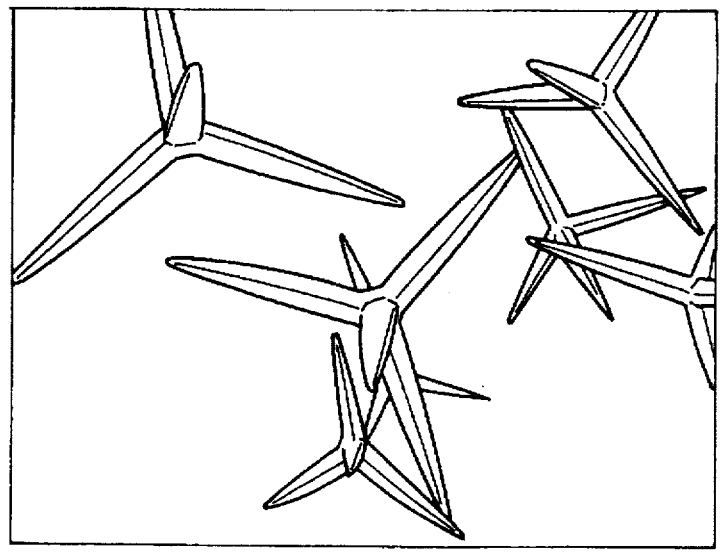
FIG. 8 is a schematic view of a photograph of whiskers through an electron microscope.

Also, if the zinc oxide whiskers 3 are used as the micro needle-like material, the micro pits and projections can be formed with higher efficiency. That is, since the zinc oxide whiskers 3 have a tetrapod-like shape as shown in FIG. 8, enough pits and projections to enhance the water repellency appear on the surface only by immobilizing the zinc oxide whiskers 3 simply on the surface even without aligning the individual zinc oxide whiskers 3 in their immobilized direction. From this fact and another that the zinc oxide whiskers 3 are inexpensive, a water-repellent surface having remarkably excellent water repellency can be obtained by a very simple, inexpensive method.

The present invention is not limited to the above examples. Although the zinc oxide whiskers 3 have been used as the micro needle-like material in the above-described examples, the water-repellent surface can be fabricated also by using other whiskers. In such a case, for example, the whiskers may properly be aligned so as to form an angle nearly perpendicular to the surface of the object by utilizing static electricity, in a step before the whiskers are immobilized.

Further, it is possible to improve the state of mixing with a curable liquid such as a resin by coating the surface of the micro needle-like material with a surface active agent. It is also possible to use a thin film formed by a CVD or sputtering process instead of using an adhesive substance as the substance for immobilizing the micro needle-like material.

Whereas a method using a resin as the liquid that can be cured through appropriate processing has been presented in the first and second examples, any substance having a melting point equal to the sublime point (or melting point) or less of the micro needle-like material may be used. That is, the process of mixing the micro needle-like material with its immobilizing substance may be carried out at temperatures equal to the melting point or less of the micro needle-like material and equal to melting point or more of the substance, and the mixture may be cured by cooling. For example, since the sublime point of zinc oxide whiskers is 1720° C., it is possible to use metals, ceramics, glasses, and others whose melting points are equal to the temperature or less. For metals, ceramics, glasses, and the like, such injection molding as shown in the second example would be impossible, where a molding method suitable for the material may be used such as casting, rolling, and sintering.

In the second example, a case where the shape of the object 11 depends on the state how the mixture is cured has been described. However, it is needless to say that the shape of the object 11 may be arranged by applying a forming process such as cutting or grinding after the curing process and before the etching process. This is applicable also when the object is molded by sintering, where a molding process may of course be added after sintering.

In the examples, it is preferable that the surface area of the object including the whiskers is smaller than twice the surface area of the object.

According to the water-repellent surface structure of the present invention, as apparent from the foregoing description, pits and projections by a micro needle-like material are formed on the surface of the object. Therefore, extremely small pits and projections can be formed securely and efficiently. Moreover, the surface with pits and projections is composed of a water-repellent substance. As a result, a water-repellent surface having remarkably excellent water repellency can be obtained.

In particular, if zinc oxide whiskers are used as the micro needle-like material, micro pits and projections can be formed with higher efficiency. That is, since zinc oxide whiskers have a tetrapod shape, enough pits and projections to enhance the water repellency can be formed only by immobilizing the zinc oxide whiskers simply on the surface even without aligning the individual zinc oxide whiskers (their needle-like fibers with thickness 0.2 to 3 µm and length 2 to 50 µm). Yet, since the zinc oxide whiskers are low in price, a water-repellent surface having extremely good water repellency can be obtained by a very simple, inexpensive method.

Also, the coating layer can be easily formed as a fluoric polymer deposition layer by forming a gas containing C and F into plasma and depositing it, a baked layer of a fluorocarbon polymer, a chemical adsorption monomolecular film containing fluorine formed through siloxane bond, an applied layer of a fluororesin, an applied layer of a silicon resin, or the like.

Such water-repellent surfaces can be formed by selecting an optimum method according to the structure, properties, applications, and the like of the object from among the fabrication methods as described above. Further, the coating of a water-repellent substance in the process can be easily accomplished by plasma deposition, baking, chemical adsorption, application, and the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for fabricating a water-repellent surface, comprising steps of:

coating a surface of a needle-like material with a water-repellent substance;

applying an adhesive substance onto a surface of an object; and dispersing the needle-like material coated with the water-repellent substance, onto the surface of the object with the adhesive substance applied thereto to thereby immobilize the needle-like material on the surface of the object.

2. The method for fabricating a water-repellent surface according to claim 1, wherein the step of coating with a water-repellent substance is carried out by a plasma deposition process.

3. The method for fabricating a water-repellent surface according to claim 1, wherein the step of coating with a water-repellent substance is carried out by a baking process.

4. The method for fabricating a water-repellent surface according to claim 1, wherein the step of coating with a water-repellent substance is carried out by a chemical adsorption process.

5. The method for fabricating a water-repellent surface according to claim 1, wherein the step of coating with a water-repellent substance is carried out by an application process.

* * * * *